US010235706B2

(12) United States Patent
Goulart et al.

(10) Patent No.: US 10,235,706 B2
(45) Date of Patent: Mar. 19, 2019

(54) METHODS AND SYSTEMS FOR PROVIDING REMINDERS FOR PRODUCTS IN PROXIMITY

(71) Applicant: Wal-Mart Stores, Inc., Bentonville, AR (US)

(72) Inventors: Valerie Goulart, Seattle, WA (US); Stefan Li, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 83 days.

(21) Appl. No.: 14/528,954

(22) Filed: Oct. 30, 2014

(65) Prior Publication Data
US 2016/0125505 A1 May 5, 2016

(51) Int. Cl.
G06Q 30/00 (2012.01)
G06Q 30/06 (2012.01)
H04W 4/02 (2018.01)

(52) U.S. Cl.
CPC ..... G06Q 30/0633 (2013.01); G06Q 30/0639 (2013.01); H04W 4/023 (2013.01)

(58) Field of Classification Search
CPC .......... G06Q 20/3224; G06Q 30/0261; G06Q 30/0601–30/0645; H04W 4/021
USPC ............................... 705/26.1–27.2
See application file for complete search history.

(56) References Cited

U.S. PATENT DOCUMENTS

| 7,580,699 B1 | 8/2009 | Shaw |
| 7,689,473 B2 | 3/2010 | Borom |
| 7,775,430 B2 | 8/2010 | Lin |
| 7,819,315 B1 | 10/2010 | Pienkos |
| 8,484,076 B2 | 7/2013 | Roberts |
| 8,751,316 B1 | 6/2014 | Fletchall |
| 8,781,622 B2 | 7/2014 | Mockus |
| 8,787,933 B1 | 7/2014 | Pienkos |
| 2002/0178013 A1 | 11/2002 | Hoffman |
| 2007/0182555 A1* | 8/2007 | Walker ................. G07G 1/0036 340/572.1 |
| 2008/0074264 A1 | 3/2008 | Sharpe |

(Continued)

FOREIGN PATENT DOCUMENTS

EP 1028408 A1 8/2000

OTHER PUBLICATIONS

WirelessWERX Introduces Mobile Consumer Tracking Solution for In-Store Consumer Analytics and Insights, Jan. 10, 2012, Business Wire (Year: 2012).*

(Continued)

Primary Examiner — Brandy A Zukanovich
Assistant Examiner — Brittney N Miller
(74) Attorney, Agent, or Firm — Bryan Cave Leighton Paisner LLP

(57) ABSTRACT

Various examples of methods and systems for providing reminders for products in proximity are described. In one implementation, a method may receive information related to a list of one or more items available for sale at a physical store, wherein the list is associated with a user. The method may also receive information related to a location of a user device associated with the user. Based at least in part on a distance between the user device and at least one item on the list of one or more items, the method may further providing an indication to the user device that the user device is proximate the at least one item on the list of one or more items.

20 Claims, 5 Drawing Sheets

(56) References Cited

U.S. PATENT DOCUMENTS

| | | |
|---|---|---|
| 2008/0182591 A1 | 7/2008 | Krikorian |
| 2009/0012704 A1 | 1/2009 | Franco |
| 2010/0057541 A1* | 3/2010 | Bonner .............. G06Q 30/0261 |
| | | 705/26.1 |
| 2010/0185504 A1* | 7/2010 | Rajan .................... G06Q 30/02 |
| | | 705/14.13 |
| 2011/0106624 A1* | 5/2011 | Bonner .............. G06Q 30/0261 |
| | | 705/14.58 |
| 2012/0122492 A1 | 5/2012 | Zhou |
| 2012/0280836 A1 | 11/2012 | Roesner |
| 2013/0054363 A1 | 2/2013 | Sasankan |
| 2013/0060627 A1 | 3/2013 | Harrison |
| 2013/0103537 A1 | 4/2013 | Hewett |
| 2013/0191246 A1* | 7/2013 | Calman .............. G06Q 30/0639 |
| | | 705/26.9 |
| 2013/0203443 A1 | 8/2013 | Heater |
| 2014/0006155 A1 | 1/2014 | Ramirez |
| 2014/0087761 A1 | 3/2014 | Baskin |
| 2014/0188658 A1 | 7/2014 | Li |
| 2014/0195374 A1* | 7/2014 | Bassemir ........... G06Q 30/0639 |
| | | 705/26.8 |
| 2014/0201026 A1 | 7/2014 | Adoni |
| 2014/0358724 A1* | 12/2014 | Nallu ................ G06F 17/30657 |
| | | 705/26.8 |
| 2015/0317708 A1* | 11/2015 | Eramian ................ G06Q 30/06 |
| | | 705/26.8 |

OTHER PUBLICATIONS

Grifon, Brenda C., PLDT Group to exploit growth in digital marketing business through Smart Ads, Jun. 19, 2014, Business Mirror (Year: 2014).*

* cited by examiner

METHODS AND SYSTEMS FOR PROVIDING REMINDERS FOR PRODUCTS IN PROXIMITY

TECHNICAL FIELD

The present disclosure relates to methods and systems for providing reminders for products that are in proximity of users.

BACKGROUND

With the increasing trend of online shopping, a brick-and-mortar merchant that operates a number of physical stores to sell products and services may also utilize the Internet as an additional avenue to sell the products and services. For example, in addition to its existing physical stores, a merchant may also operate an electronic commerce (e-commerce) website through which consumers can purchase one or more of the products and services offered by the merchant.

In some cases, a consumer may visit the e-commerce website associated with the merchant to browse a number of products and services offered by the merchant, some or all of which may be available at one or more physical stores associated with the merchant. The consumer may indicate an interest in one or more items to the merchant, e.g., by creating a wish list on the website that includes the one or more items. When the consumer subsequently visits one of the physical stores associated with the merchant, however, the consumer may not know the exact location, e.g., aisle and shelf, of each item on the wish list and hence may need to spend time to find those items. Moreover, it is possible that the consumer may not remember each item on the wish list and, therefore, may forget to purchase one or some of the items on the wish list during the visit to the physical store.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
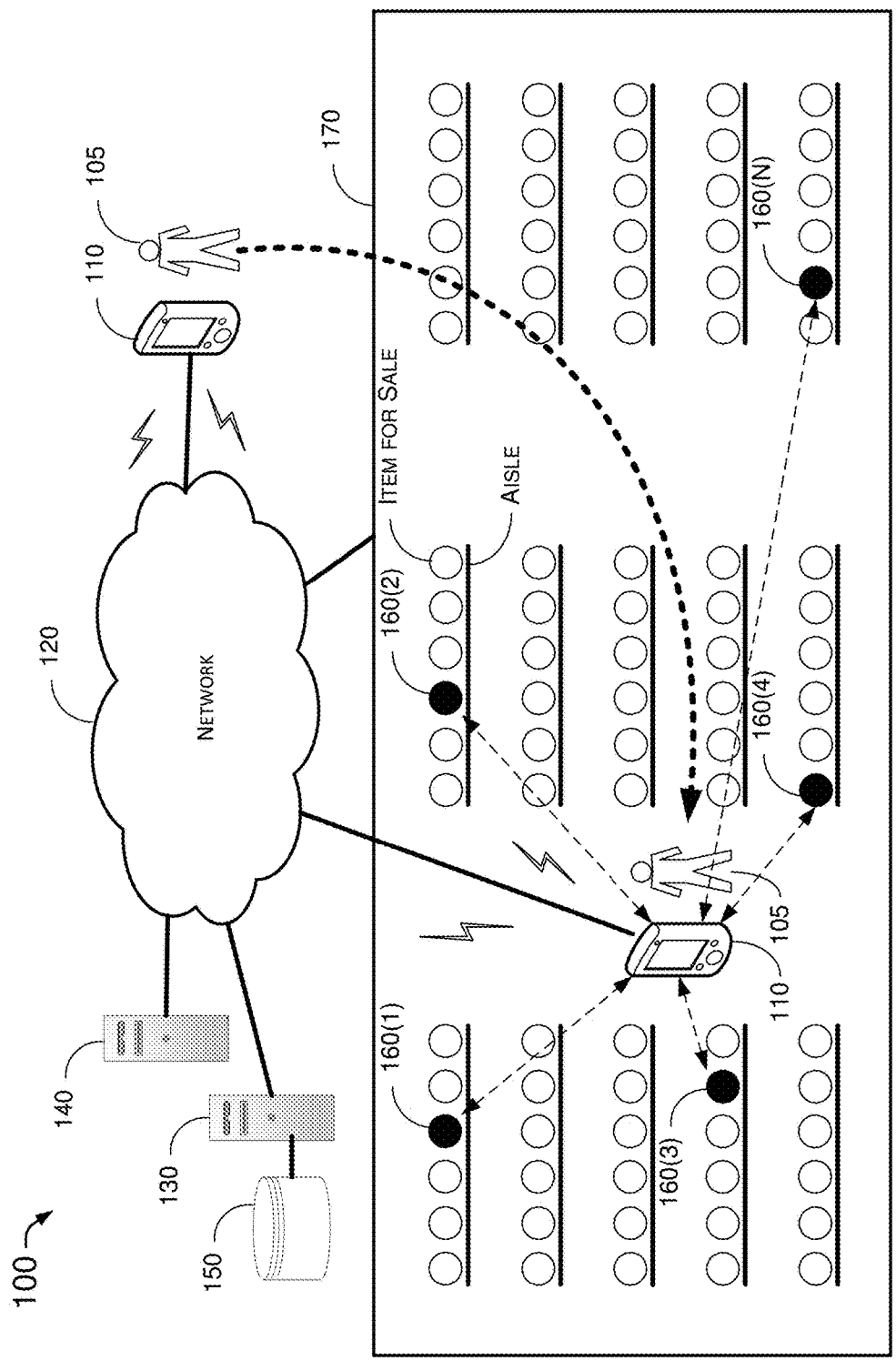
FIG. 1 is a diagram depicting an example computing environment in which example embodiments may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The articles "a" and "an" are used herein to refer to one or to more than one (i.e. to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

FIG. 1 is a diagram depicting an example computing environment 100 in which example embodiments of the present disclosure may be implemented. In example computing environment 100, a brick-and-mortar merchant that operates a number of physical stores (including a physical store 170) to sell products and services may also allow online shopping of its products and services by online shoppers (herein interchangeably referred to as users), e.g., a user 105 using a user device 110, at an e-commerce website hosted on a web server 140 via a network 120. Web server 140 may be operated by or otherwise associated with the merchant to host the e-commerce website as an additional channel for the merchant to sell its products and services. Although one web server 140 is shown in FIG. 1, some embodiments may use multiple web servers 140 to implement the e-commerce website.

Example computing environment 100 may also include a transaction server 130 in which embodiments of the present disclosure are implemented. That is, transaction server 130 may be configured to allow users, e.g., user 105, to place a new order of one or more items in addition to a pre-existing online order before picking up the online order at a physical store, e.g., physical store 170. For example, transaction server 130 may be configured to perform operations of each of example processes 300, 400 and 500 described below. Transaction server 130 may be communicatively connected to a database 150 via network 120 or a local area network. In some embodiments, database 150 may be an integral part of transaction server 130. Database 150 may record, store or otherwise contain therein data associated with a set of products and/or services that are available for sale at the e-commerce website hosted on web server 140. Database 150 may also record, store or otherwise contain therein data associated with a set of products and/or services that are available for sale at physical store 170. Transaction server 130 and database 150 may be operated by or otherwise associated with the merchant. Although one transaction server 130 and one database 150 are shown in FIG. 1, some embodiments may use multiple transaction servers 130 and/or multiple databases 150 to implement embodiments of the present disclosure.

Physical store 170 may contain or otherwise store therein a plurality of items, e.g., products, that are for sale and displayed on shelves arranged in aisles, as shown in FIG. 1. Among the plurality of items for sale at physical store 170, there may be items 160(1), 160(2), 160(3), 160(4), . . . , 160(N) that are of interest to user 105 and included in a wish list or online shopping cart in an account associated with user 105 at the e-commerce website. When shelving the plurality of items on the shelves of the aisles of physical store 170, staff of physical store 170 may enter into one or more computing devices of physical store 170 (not shown) location information of the physical location, e.g., by aisle number and shelf number, of each item of the plurality of items. Alternatively, each item of the plurality of items may be tagged with a radio frequency identification (RFID) tag configured to respond to one or more RFID transponders (not shown) installed in physical store 170 or used by staff of physical store 170. The one or more RFID transponders may be communicatively connected to the one or more computing devices of physical store 170 to provide information related to the RFID tags associated with the plurality of items in physical store 170 to the one or more computing devices of physical store 170, which may be sent to transaction server 130. For example, each RFID transponder may be installed so that each RFID corresponds to one or more aisles of physical store 170. Moreover, each RFID transponder may be configured to query the RFID tags on the items shelved on the corresponding aisle(s) periodically, e.g., once every 30 seconds or every minute. Thus, if no response is received from the RFID tag associated with a particular item is received after multiple queries, transaction server 130 may determine that such item has been moved away, e.g., picked up by an in-store shopper.

The location information may, in turn, be transmitted by the one or more computing devices of physical store 170 to transaction server 130, which may store such information in database 150. Afterwards, transaction server 130 may determine the location of each item of the plurality of items, including the location of each of items 160(1), 160(2), 160(3), 160(4), . . . , 160(N), by accessing the location information stored in database 150.

User 105 may use user device 110, or another computing device that is communicatively connected to network 120, to visit the e-commerce website associated with the merchant to browse a number of items offered for sale by the merchant. Some or all of the browsed items may be available at one or more physical stores associated with the merchant, including physical store 170. User 105 may indicate an interest in one or more items to the merchant by, for example, creating a wish list on the e-commerce website, with the wish list including the one or more items. Alternatively, user 105 may add the one or more items of interest to an online shopping cart associated with a user account of user 105 at the e-commerce website, and not proceed further to complete a transaction to purchase the one or more items in the shopping cart. When user 105 subsequently visits one of the physical stores associated with the merchant, such as physical store 170, user 105 may not know the exact location, e.g., aisle and shelf, of each item of the one or more items of interest. Alternatively or additionally, user 105 may not remember each item of the one or more items of interest.

User device 110 may be a mobile device such as a smartphone, a laptop computer, a notebook computer, a tablet computer, a wearable computer, a desktop computer, a personal data assistant (PDA), an internet appliance, a server or any other computing device configured with a network connection. Each of web server 140 and transaction server 130 may include one or more servers or any suitable computing device configured with a network connection. Each of transaction server 130 and web server 140 may be operated by the merchant or a respective service provider. In some embodiments, transaction server 130 and web server 140 may be implemented together in one or more servers or computing devices.

Network 120 may include wired and/or wireless networks that enable communications between the various networked devices associated with example computing environment 100, such as user device 110, transaction server 130, web server 140, and one or more computing devices of physical store 170. Network 120 may include a variety of different networked devices that are of different types and families. In some embodiments, network 120 may include one or more local area networks (LANs), one or more wide area networks (WAN), one or more mobile telephone networks (MTNs), and/or other types of networks, possibly in conjunction with one another, to facilitate communication among the various networked devices of FIG. 1.

In various embodiments of the present disclosure, transaction server 130 may be configured to provide reminders to user 105 that user 105 (or, more precisely, user device 110) is proximate at least one of the one or more items of interest when user device 110 is proximate or in physical store 170. For example, transaction server 130 may receive, e.g., from web server 140, item information entered by user 105 via the e-commerce website associated with the merchant, where the item information may indicate a list of one or more items available for sale at physical store 170 that are of interest to user 105, such as items 160(1), 160(2), 160(3), 160(4), ..., 160(N) as shown in FIG. 1. Transaction server 130 may receive user location information, e.g., from user device 110, that indicates that user device 110 is proximate or in physical store 170. That is, given that user device 110 is proximate or in physical store 170, transaction server 130 may infer that user 105, to whom user device 110 is associated, may also be proximate or in physical store 170. In some embodiments, transaction server 130 may receive, from web server 140, the user location information as entered by user 105 via the e-commerce website associated with the merchant. In some embodiments, user 105 may have installed an app on user device 110 that provides an update on the user location information, e.g., global positioning system (GPS) coordinates, of user device 110 to transaction server 130 via network 120 periodically or in real-time manner. For example, user device 110 may have an app installed thereon that, when activated by user 105, transmits information indicative a location of the user device 110 to transaction server 130 periodically or in real-time manner.

In response to receiving the user location information, transaction server 130 may determine a distance between user device 110 and each item on the list of one or more items, e.g., items 160(1), 160(2), 160(3), 160(4), ..., 160(N). Transaction server 130 may access database 150 to obtain item location information regarding items 160(1), 160(2), 160(3), 160(4), ..., 160(N), and calculate, compute or otherwise determine a distance between user device 110 and each of items 160(1), 160(2), 160(3), 160(4), ..., 160(N) using the user location information. Transaction server 130 may also provide an indication to user device 110 based at least in part on the determined distance between user device 110 and at least one of items 160(1), 160(2), 160(3), 160(4), ..., 160(N). For instance, transaction server 130 may send a signal to user device 110 to trigger user device 110 to provide a visual and/or audible notification to user 105 when transaction server 130 determines that user device 110 is proximate at least one item among items 160(1), 160(2), 160(3), 160(4), ..., 160(N), e.g., when the distance between user device 110 and one of items 160(1), 160(2), 160(3), 160(4), ..., 160(N) is determined by transaction server 130 to be less than or equal to a threshold distance. Alternatively, transaction server 130 may send a signal to user device 110 to trigger user device 110 to provide a visual and/or audible notification to user 105 when transaction server 130 determines that user device 110 (and presumably user 105 as well) has passed by one of items 160(1), 160(2), 160(3), 160(4), ..., 160(N) but such item has not been picked up by user 105. The threshold distance may be predefined by either or both of the merchant and user 105, and may be adjusted by either or both of the merchant and user 105. The notification provided by user device 110, as triggered by transaction server 130, may indicate either or both of an identification, e.g., a picture or textual description thereof, of the at least one item of interest and the distance between user device 110 and such item.

Transaction server 130 may determine whether or not an item of interest, e.g., one of items 160(1), 160(2), 160(3), 160(4), ..., 160(N), has or has not been picked up by user 105 by one of at least two ways. For example, transaction server 130 may first determine that user device 110 (and, hence, presumably user 105 too) is proximate one of items 160(1), 160(2), 160(3), 160(4), ..., 160(N) when transaction server 130 determines that the distance between user device 110 and such item is less than the threshold distance, e.g., one to three feet. Next, transaction server 130 may determine that the location of such item has changed, e.g., user 105 has picked up such item, when there is no response from an RFID tag associated with such item to queries from a corresponding RFID transponder at physical store 170. If the RFID tag of such item continues to respond to the corresponding RFID transponder, transaction server 130 may determine that the location of such item has not changed, e.g., such item has not been picked up by user 105. Alternatively, user 105 may indicate, e.g., using user device 110 via the e-commerce website associated with the merchant, that one of items 160(1), 160(2), 160(3), 160(4), ..., 160(N) has been picked up by user 105, and web server 140 may send such indication to transaction server 130. Accordingly, transaction server 130 may determine that such item has been picked up by user 105.

Advantageously, the ability to remind users of the proximity of one or more items of interest may save time for users. For example, user 105 may appreciate being reminded that one or more items of interest are in proximity, especially if user 105 does not know the exact location of each of the one or more items or even has forgotten about at least some of them. From the perspective of the merchant, such ability may help increase total sales revenue and improve customer satisfaction and loyalty.

Figure 2:
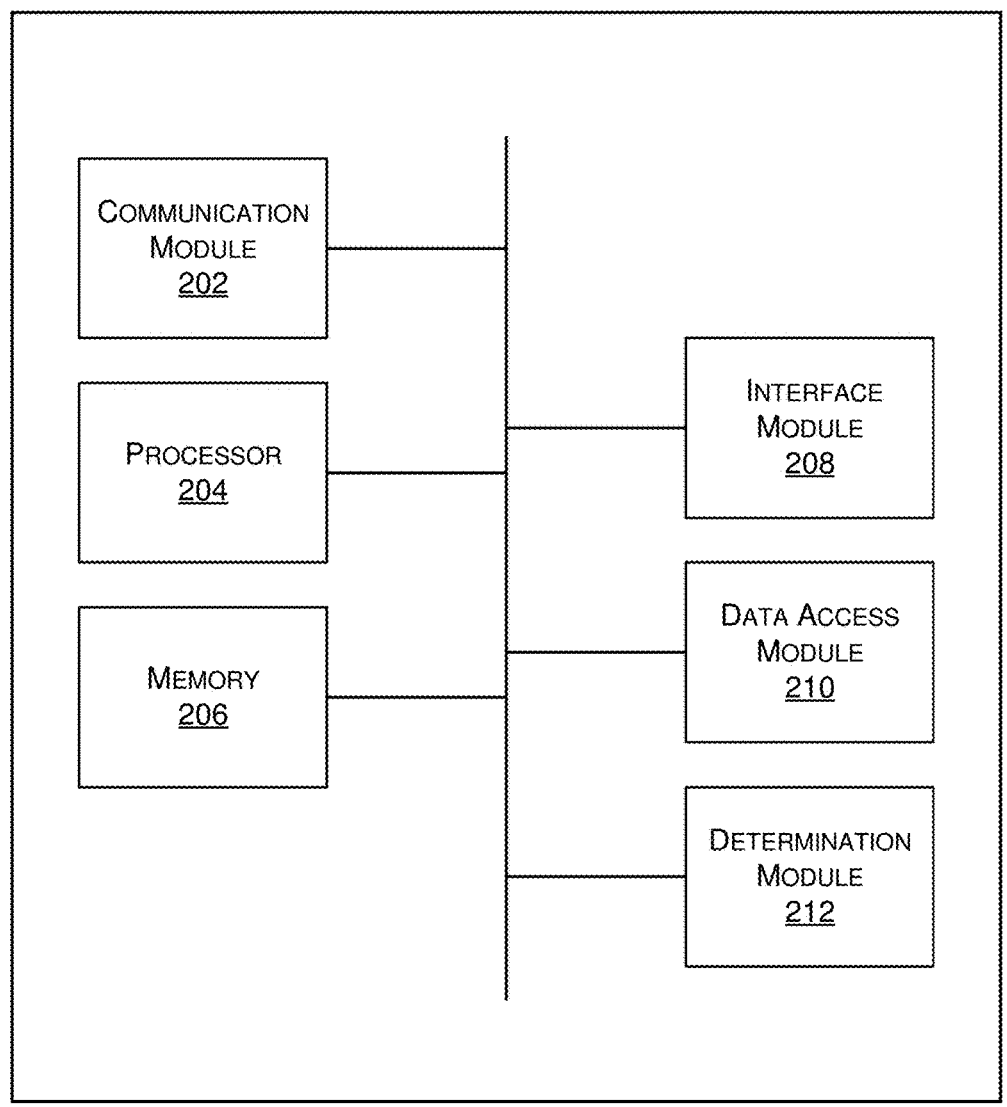
FIG. 2 is a block diagram depicting an embodiment of a transaction server configured to provide reminders for products that are in proximity of users.

FIG. 2 is a block diagram depicting an embodiment of a transaction server 200 configured to implement example embodiments for providing reminders for products that are in proximity of users in accordance with the present disclosure. Transaction server 200 may perform various functions related to embodiments of the present disclosure. In some embodiments, transaction server 200 may be implemented in or as transaction server 130 of FIG. 1. In some embodiments, transaction server 200 may be implemented as one or more computing devices that cooperatively implement the functions described herein. Transaction server 200 may include a communication module 202, one or more processors (shown as a processor 204 in FIG. 2), and a memory 206. Communication module 202 may allow transaction server 200 to communicate with other networks, systems, servers, computing devices, etc. Processor 204 may execute one or more sets of instructions to implement the functionality provided by transaction server 200. Memory 206 may store the one or more sets of instructions executable by processor 204 as well as other data used by processor 204.

Transaction server 200 may also include an interface module 208, a data access module 210 and a determination module 212. Each of interface module 208, data access module 210 and determination module 212 may perform one or more functions under the control of processor 204. For example, under the control of processor 204, each of interface module 208, data access module 210 and determination module 212 may perform one or more operations of each of example processes 300, 400 and 500 described below. Although interface module 208, data access module 210 and determination module 212 are depicted in FIG. 2 as discrete modules separate from the processor 204, in various implementations one or more of interface module 208, data access module 210 and determination module 212 may be integral part of processor 204. For simplicity, a task or function performed by any of interface module 208, data access module 210 and determination module 212 may be described as if such task or function is performed by processor 204.

Interface module 208 may be configured to receive item information entered by user 105 via the website associated with the merchant, where the item information indicates a list of one or more items available for sale at physical store 170 associated with the merchant, e.g., items 160(1), 160(2), 160(3), 160(4), . . . , 160(N). Interface module 208 may also be configured to receive user location information related to user device 110 associated with user 105. For example, interface module 208 may receive user location information when user device 110 is proximate or inside physical store 170. Interface module 208 may also be configured to receive user location information entered by user 105 via the e-commerce website associated with the merchant or, alternatively, receive real-time or periodic update of the location of user device 110. For example, user device 110 may have an app installed thereon that, when activated by user 105, transmits information indicative a location of the user device 110 to interface module 208 periodically or in real-time manner.

Data access module 210 may be configured to access database 150 to access data associated with the plurality of items that are available for sale at physical store 170. For example, data access module 210 may access database 150 to obtain location information of each item of the plurality of items, including location information regarding the location of each of items 160(1), 160(2), 160(3), 160(4), . . . , 160(N).

Determination module 212 may be configured to determine, based on location information of items in physical store 170 obtained by data access module 210 and user location information of user device 110 obtained by interface module 208, the distance between user device 110 and each of items 160(1), 160(2), 160(3), 160(4), . . . , 160(N) as user 105 roams around in physical store 170 with user device 110 in possession. Determination module 212 may, based at least in part on the distance between user device 110 and each of items 160(1), 160(2), 160(3), 160(4), . . . , 160(N), provide an indication to user device 110. This indication allows user 105 to be informed, e.g., by the indication as displayed, played or otherwise presented by user device 110, that user device 110 (and hence presumably user 105) is proximate at least one of items 160(1), 160(2), 160(3), 160(4), . . . , 160(N). For example, determination module 212 may be configured to send a signal to user device 110 to trigger user device 110 to provide a visual and/or audible notification to user 105 when determination module 212 determines that user device 110 is proximate at least one of items 160(1), 160(2), 160(3), 160(4), . . . , 160(N). Determination module 212 may also be configured to send a signal to user device 110 to trigger user device 110 to provide a visual and/or audible notification to user 105 when determination module 212 determines that user device 110 has passed by one of items 160(1), 160(2), 160(3), 160(4), . . . , 160(N) and that such item has not been picked up by user 105. Determination module 212 may also be configured to send a signal to user device 110 to trigger user device 110 to indicate either or both of an identification, e.g., a picture or textual description thereof, of each of items 160(1), 160(2), 160(3), 160(4), . . . , 160(N) and the distance between user device 110 and such item when determination module 212 determines that user device 110 is in proximity of such item.

Figure 3:
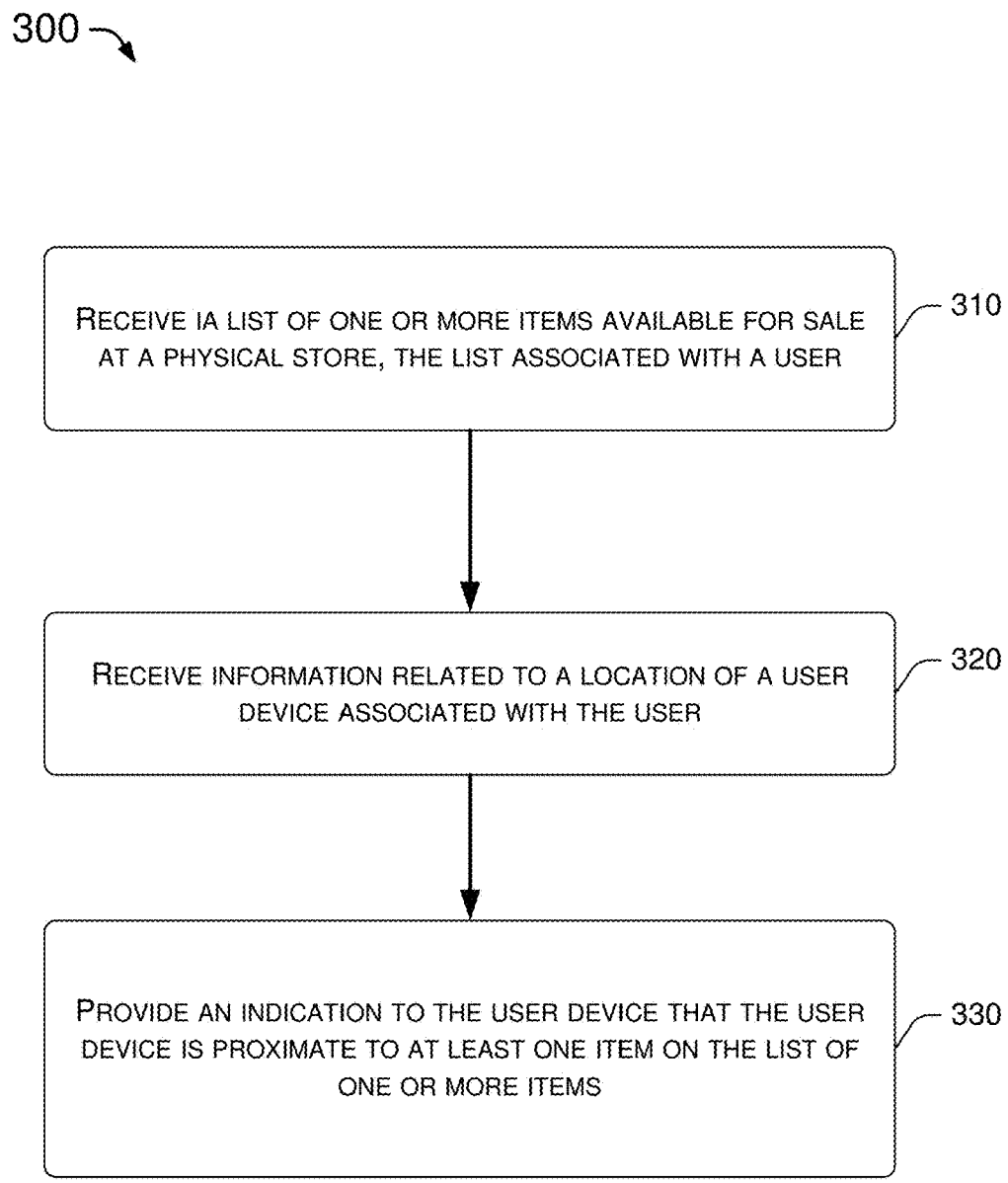
FIG. 3 is a flowchart diagram of an example process for providing reminders for products that are in proximity of users.

FIG. 3 is a flowchart diagram of an example process 300 related to providing reminders for products that are in proximity of users in accordance with an embodiment of the present disclosure. Example process 300 may include one or more operations, actions, or functions such as 310, 320 and 330. Although illustrated as discrete blocks, various blocks may be divided into additional blocks, combined into fewer blocks, or eliminated, depending on the desired implementation. Example process 300 may be implemented by one or more processors including, for example, one or more processors of transaction server 130 and/or transaction server 200. For illustrative purposes, the operations described below are performed by one or more processors of transaction server 130 and/or processor 204 of transaction server 200. Each of transaction server 130 and transaction server 200 may be referred to as a computing device herein.

At 310, one or more processors of transaction server 130 or transaction server 200 may receive a list of one or more items available for sale at a physical store, where the list is associated with a user.

At 320, the one or more processors of transaction server 130 or transaction server 200 may receive information related to a location of a user device associated with the user.

At 330, the one or more processors of transaction server 130 or transaction server 200 may provide to the user device an indication that the user device is proximate at least one item on the list of one or more items. This may be done by the one or more processors of transaction server 130 or transaction server 200 based at least in part on a distance between the user device and the at least one item on the list of one or more items.

In at least some embodiments, in providing to the user device an indication that the user device is proximate at least one item on the list of one or more items, example process 300 may involve the one or more processors of transaction server 130 or transaction server 200 triggering the user device to provide a notification to the user in response to the user device being proximate the at least one item.

In at least some embodiments, in providing an indication to the user device that the user device is proximate at least one item on the list of one or more items, example process 300 may involve the one or more processors of transaction server 130 or transaction server 200 triggering the user device to provide a notification to the user in response to the user device passing by the at least one item and the at least one item not having been picked up by the user.

In at least some embodiments, example process 300 may also involve the one or more processors of transaction server 130 or transaction server 200 determining that the user is proximate the at least one item in response to the distance between the user device and the at least one item being less than a threshold distance. Example process 300 may further involve the one or more processors of transaction server 130 or transaction server 200 determining whether the at least one item has been picked up by the user.

In at least some embodiments, in determining whether the at least one item has been picked up by the user, example process 300 may also involve the one or more processors of transaction server 130 or transaction server 200 determining whether a location of the at least one item has not changed or, alternatively, determining whether an indication by the user has been received that indicates the at least one item has been picked up by the user.

In at least some embodiments, in providing an indication to the user device that the user device is proximate at least one item on the list of one or more items, example process 300 may involve the one or more processors of transaction server 130 or transaction server 200 triggering the user device to indicate either or both of an identification of the at least one item and the distance between the user device and the at least one item.

In at least some embodiments, example process 300 may also involve the one or more processors of transaction server 130 or transaction server 200 determining a location of each item on the list of one or more items in the physical store. Example process 300 may further involve the one or more processors of transaction server 130 or transaction server 200 determining the distance between the user device and each item on the list of one or more items.

In at least some embodiments, in receiving information related to a location of a user device, example process 300 may involve the one or more processors of transaction server 130 or transaction server 200 receiving real-time or periodic update of the location of the user device when the user device is proximate or in the physical store.

In at least some embodiments, in providing an indication to the user device that the user device is proximate at least one item on the list of one or more items, example process 300 may involve the one or more processors of transaction server 130 or transaction server 200 triggering the user device to provide either or both of a visual notification and an audible notification.

Figure 4:
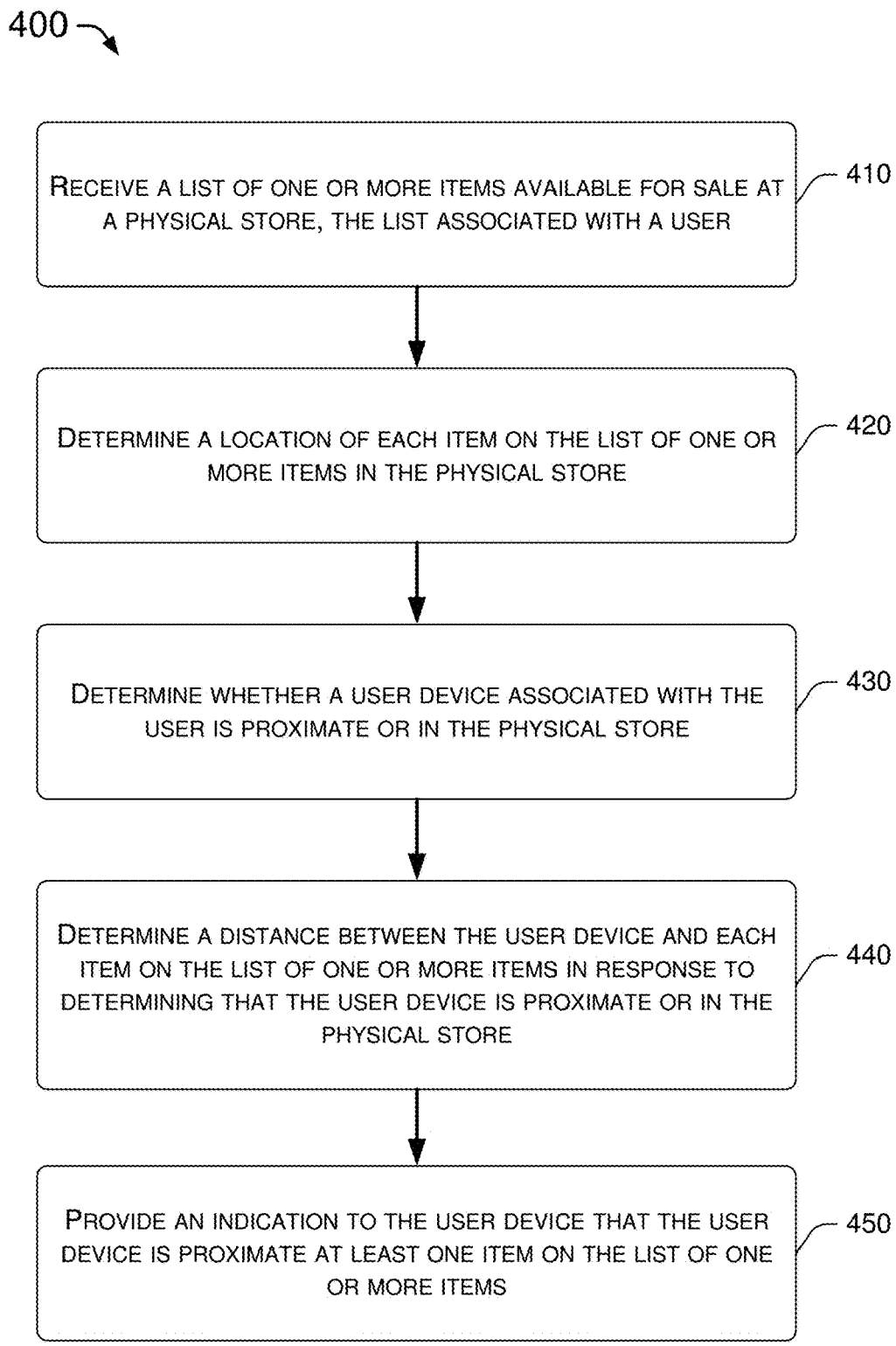
FIG. 4 is a flowchart diagram of another example process for providing reminders for products that are in proximity of users.

FIG. 4 is a flowchart diagram of an example process related to providing reminders for products that are in proximity of users in accordance with another embodiment of the present disclosure. Example process 400 may include one or more operations, actions, or functions such as 410, 420, 430, 440 and 450. Although illustrated as discrete blocks, various blocks may be divided into additional blocks, combined into fewer blocks, or eliminated, depending on the desired implementation. Example process 400 may be implemented by one or more processors including, for example, one or more processors of transaction server 130 and/or transaction server 200. For illustrative purposes, the operations described below are performed by one or more processors of transaction server 130 and/or processor 204 of transaction server 200. Each of transaction server 130 and transaction server 200 may be referred to as a computing device herein.

At 410, one or more processors of transaction server 130 or transaction server 200 may receive a list of one or more items available for sale at a physical store, where the list is associated with a user.

At 420, the one or more processors of transaction server 130 or transaction server 200 may determine a location of each item on the list of one or more items in the physical store.

At 430, the one or more processors of transaction server 130 or transaction server 200 may determine whether a user device associated with the user is proximate or in the physical store.

At 440, the one or more processors of transaction server 130 or transaction server 200 may determine a distance between the user device and each item on the list of one or more items in response to determining that the user device is proximate or in the physical store.

At 450, the one or more processors of transaction server 130 or transaction server 200 may provide an indication to the user device that the user device is proximate at least one item on the list of one or more items. This may be done by the one or more processors of transaction server 130 or transaction server 200 based at least in part on a distance between the user device and the at least one item on the list of one or more items.

In at least some embodiments, in providing an indication to the user device that the user device is proximate at least one item on the list of one or more items, example process 400 may involve the one or more processors of transaction server 130 or transaction server 200 triggering the user device to provide a notification to the user in response to the user device being proximate the at least one item.

In at least some embodiments, in providing an indication to the user device that the user device is proximate at least one item on the list of one or more items, example process 400 may involve the one or more processors of transaction server 130 or transaction server 200 triggering the user device to provide a notification to the user in response to the user device passing by the at least one item and the at least one item not having been picked up by the user.

In at least some embodiments, example process 400 may also involve the one or more processors of transaction server 130 or transaction server 200 determining that the user is proximate the at least one item in response to the distance between the user device and the at least one item being less than a threshold distance. Example process 400 may further involve the one or more processors of transaction server 130 or transaction server 200 determining, by the one or more processors, whether the at least one item has been picked up by the user.

In at least some embodiments, in determining whether the at least one item has been picked up by the user, example process 400 may involve the one or more processors of transaction server 130 or transaction server 200 determining whether a location of the at least one item has not changed or, alternatively, determining whether an indication by the user has been received that indicates the at least one item has been picked up by the user.

In at least some embodiments, in providing an indication to the user device that the user device is proximate at least one item on the list of one or more items, example process 400 may involve the one or more processors of transaction server 130 or transaction server 200 triggering the user device to indicate either or both of an identification of the at least one item and the distance between the user device and the at least one item.

Figure 5:
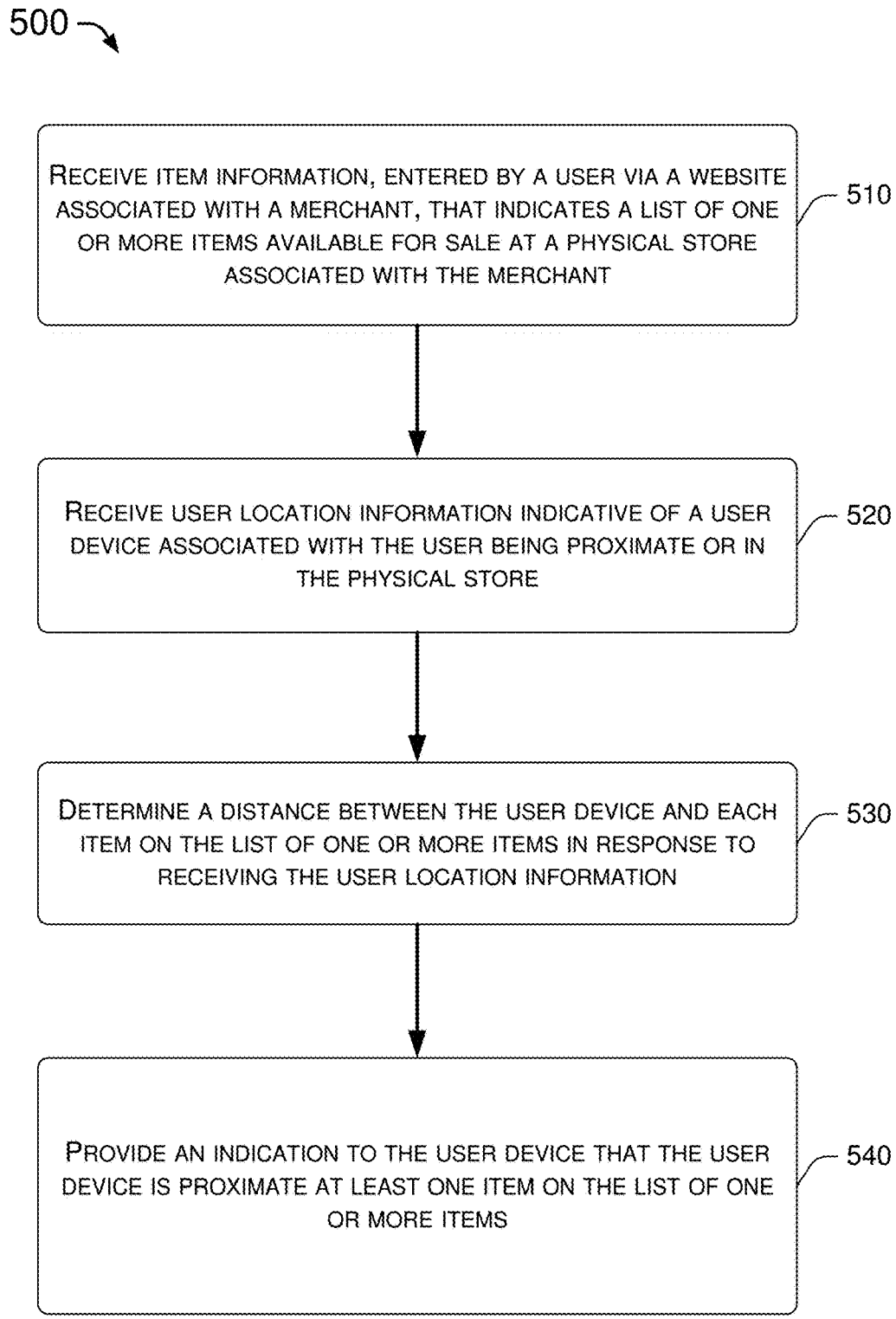
FIG. 5 is a flowchart diagram of yet another example process for providing reminders for products that are in proximity of users.

FIG. 5 is a flowchart diagram of an example process related to providing reminders for products that are in proximity of users in accordance with yet another embodiment of the present disclosure. Example process 500 may include one or more operations, actions, or functions such as

510, 520, 530 and 540. Although illustrated as discrete blocks, various blocks may be divided into additional blocks, combined into fewer blocks, or eliminated, depending on the desired implementation. Example process 500 may be implemented by one or more processors including, for example, one or more processors of transaction server 130 and/or transaction server 200. For illustrative purposes, the operations described below are performed by one or more processors of transaction server 130 and/or processor 204 of transaction server 200. Each of transaction server 130 and transaction server 200 may be referred to as a computing device herein.

At 510, one or more processors of transaction server 130 or transaction server 200 may receive item information entered by a user via a website associated with a merchant, the item information indicative of a list of one or more items available for sale at a physical store associated with the merchant.

At 520, the one or more processors of transaction server 130 or transaction server 200 may receive user location information indicative of a user device associated with the user being proximate or in the physical store.

At 530, the one or more processors of transaction server 130 or transaction server 200 may, in response to receiving the user location information, determine a distance between the user device and each item on the list of one or more items.

At 540, the one or more processors of transaction server 130 or transaction server 200 may provide an indication to the user device that the user device is proximate at least one item on the list of one or more items. This may be done by the one or more processors of transaction server 130 or transaction server 200 based at least in part on the distance between the user device and the at least one item on the list of one or more items.

In at least some embodiments, in providing an indication to the user device that the user device is proximate at least one item on the list of one or more items, example process 500 may involve the one or more processors of transaction server 130 or transaction server 200 triggering the user device to provide a notification to the user in response to the user device being proximate the at least one item.

In at least some embodiments, in providing an indication to the user device that the user device is proximate at least one item on the list of one or more items, example process 500 may involve the one or more processors of transaction server 130 or transaction server 200 triggering the user device to provide a notification to the user in response to the user device passing by the at least one item and the at least one item not having been picked up by the user.

In at least some embodiments, in providing an indication to the user device that the user device is proximate at least one item on the list of one or more items, example process 500 may involve the one or more processors of transaction server 130 or transaction server 200 triggering the user device to indicate either or both of an identification of the at least one item and the distance between the user device and the at least one item.

In at least some embodiments, in receiving user location information indicative of the user device associated with the user being proximate or in the physical store, example process 500 may involve the one or more processors of transaction server 130 or transaction server 200 receiving the user location information entered by the user via the website associated with the merchant or receive real-time or periodic update of the location of the user device.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method, comprising:
providing a radio frequency transponder corresponding to one or more aisles of a physical store, wherein the radio frequency transponder is configured to communicate first information associated with a radio frequency tag coupled to each item of a plurality of items located on the one or more aisles of the physical store;
receiving, by a transaction server, a list of one or more items of the plurality of items available for sale at the physical store, wherein the list is associated with a user, wherein the transaction server comprises a processor;
periodically receiving, by the processor, second information over a wireless network related to a location of a user device associated with the user, wherein the user device comprises a software application ("app") installed on the user device of the user;
determining, by the processor, that the user device is within or proximate to the physical store based on the second information received that is related to the location of the user device;
providing, by the processor, over the wireless network to the user device, an indication that the user device is proximate to at least one item on the list of one or more items of the plurality of items, wherein the providing the indication to the user device is based at least in part on:
  determining a distance between the user device and the at least one item on the list of one or more items of the plurality of items in response to the determination that the user device is within or proximate to the physical store;
  determining, by the processor, that the distance is less than a threshold distance;
  periodically querying, by the radio frequency transponder, the radio frequency tag coupled to the at least one item on the list of one or more items of the plurality of items;
  determining, by the processor, whether a response has been received to the periodic querying of the radio frequency tag coupled to the at least one item on the list of one or more items of the plurality of items;
  responsive to determining that the response has been received to the periodic querying of the radio frequency tag coupled to the at least one item on the list of one or more items of the plurality of items, determining, by the processor, that the user did not pick up the at least one item on the list of one or more items of the plurality of items when the user device was proximate to the at least one item; and
  responsive to determining that the user did not pick up the at least one item on the list of one or more items of the plurality of items when the user device was proximate to the at least one item, transmitting, by the transaction server over the wireless network, a signal to the user device to cause the user device to display on a user interface of the user device a notification which indicates that the user has passed by and did not pick up the at least one item on the list of one or more items of the plurality of items when the user device was proximate to the at least one item, wherein the notification displayed on the user interface of the user device includes a picture of the at least one item on the list of one or more items of the plurality of items that the user did not pick up and indicates the distance between the user device and the at least one item on the list of one or more items of the plurality of items.

2. The method of claim 1, further comprising triggering the user device to provide a second notification to the user in response to the user device being proximate to the at least one item.

3. The method of claim 1, wherein the determining that the user did not pick up the at least one item on the list of one or more items of the plurality of items when the user device was proximate to the at least one item further comprises determining whether a respective location of the at least one item on the list of one or more items of the plurality of items has not changed.

4. The method of claim 1, further comprising:
   determining, by the processor, a respective location of the each item on the list of one or more items of the plurality of items in the physical store; and
   determining, by the processor, the distance between the user device and the each item on the list of one or more items of the plurality of items.

5. The method of claim 1, wherein the periodically receiving, by the processor, the second information related to the location of the user device further comprises receiving real-time or periodic updates of the location of the user device while the user device is within the physical store.

6. The method of claim 1, wherein the notification which indicates that the user has passed by and did not pick up the at least one item on the list of one or more items of the plurality of items when the user device was proximate to the at least one item comprises one or more of a visual notification or an audible notification.

7. The method of claim 1, wherein the threshold distance is adjusted by one or more users or retailers of the physical store.

8. The method of claim 7, wherein the threshold distance is predefined by the one or more users or retailers.

9. The method of claim 1, wherein the notification displayed on the user interface of the user device further comprises a textual description of the at least one item on the list of one or more items of the plurality of items that the user did not pick up.

10. One or more non-transitory computer-readable media storing computer-executable instructions that, when executed by one or more processors, cause the one or more processors to perform operations comprising:
    receiving, by a transaction server, a list of one or more items of a plurality of items available for sale at a physical store, wherein the list is associated with a user, wherein the transaction server comprises a processor;
    determining, by a radio frequency transponder corresponding to one or more aisles of the physical store, a respective location of each item on the list of one or more items of the plurality of items in the physical store, wherein the radio frequency transponder is configured to communicate first information associated with a radio frequency tag coupled to each item of the plurality of items located on the one or more aisles of the physical store;
    periodically receiving, by the processor, over a wireless network, second information related to a location of a user device associated with the user, wherein the user device comprises a software application ("app") installed on the user device of the user;
    determining, by the processor, whether the user device associated with the user is proximate to or within the physical store based on the second information received that is related to the location of the user device;
    providing, by the processor, an indication to the user device that the user device is proximate to at least one item on the list of one or more items of the plurality of items, wherein the providing the indication to the user device is based at least in part on:
       determining a distance between the user device and the at least one item on the list of one or more items of the plurality of items in response to the determination that the user device is within or proximate to the physical store;
       determining that the distance is less than a threshold distance;
       periodically querying, by the radio frequency transponder, the radio frequency tag coupled to the at least one item on the list of one or more items of the plurality of items;
       determining, by the processor, whether a response has been received to the periodic querying of the radio frequency tag coupled to the at least one item on the list of one or more items of the plurality of items;
       responsive to determining that the response has been received to the periodic querying of the radio frequency tag coupled to the at least one item on the list of one or more items of the plurality of items, determining, by the processor that the user did not pick up the at least one item on the list of one or more items of the plurality of items when the user device was proximate to the at least one item; and
       responsive to determining that the user did not pick up the at least one item on the list of one or more items of the plurality of items when the user device was proximate to the at least one item, transmitting a signal to the user device to cause the user device to display on a user interface of the user device a notification which indicates that the user has passed by and did not pick up the at least one item on the list of one or more items of the plurality of items when the user device was proximate to the at least one item, wherein the notification displayed on the user interface of the user device includes a picture of the at least one item on the list of one or more items of the plurality of items that the user did not pick up and indicates the distance between the user device and the at least one item on the list of one or more items of the plurality of items.

11. The one or more non-transitory computer-readable media of claim 10, wherein the operations further comprise triggering the user device to provide a second notification to the user in response to the user device being proximate to the at least one item.

12. The one or more non-transitory computer-readable media of claim 10, wherein the determining that the user did not pick up the at least one item on the list of one or more items of the plurality of items when the user device was proximate to the at least one item further comprises determining whether the respective location of the at least one item on the list of one or more items of the plurality of items has not changed.

13. The one or more non-transitory computer-readable media of claim 10, wherein the threshold distance is adjusted by one or more users or retailers of the physical store.

14. The one or more non-transitory computer-readable media of claim 10, wherein the notification displayed on the user interface of the user device further comprises a textual description of the at least one item on the list of one or more items of the plurality of items that the user did not pick up.

15. A system, comprising:
one or more radio frequency identification (RFID) tags available coupled to each item of a plurality of items for sale at a physical store;
a plurality of radio frequency transponders installed at the physical store and configured to query the one or more RFID tags; and
a transaction server that communicates over a wireless network with the plurality of radio frequency transponders and a user device, the transaction server comprising:
  a memory configured to store one or more sets of instructions;
  a processor configured to access the memory to execute the one or more sets of instructions to perform operations comprising:
    receiving a list of one or more items of the plurality of items available for sale at the physical store, wherein the list is associated with a user;
    periodically receiving user location information indicative of a location of the user device associated with the user, wherein the user device comprises a software application ("app") installed on the user device of the user;
    determining that the user device is within or proximate to the physical store based on the user location information;
    providing an indication to the user device that the user device is proximate to at least one item on the list of one or more items of the plurality of items, wherein the providing the indication to the user device is based at least in part on:
      determining a distance between the user device and the at least one item on the list of one or more items of the plurality of items in response to the determination that the user device is within or proximate to the physical store;
      determining that the distance between the user device and the at least one item on the list of one or more items of the plurality of items is less than a threshold distance;
    periodically receiving item location information that is generated by periodic querying, by a radio frequency transponder of the plurality of radio frequency transponders, the RFID tag coupled to at least one item on the list of one or more items of the plurality of items;
    determining whether a response has been received to the periodic querying of the RFID tag coupled to the at least one item on the list of one or more items of the plurality of items;
    responsive to determining that the response has been received to the periodic querying of the RFID tag coupled to the at least one item on the list of one or more items of the plurality of items, determining that the user did not pick up the at least one item on the list of one or more items of the plurality of items when the user device was proximate to the at least one item; and
    responsive to determining that the user did not pick up the at least one item on the list of one or more items of the plurality of items when the user device was proximate to the at least one item, transmitting a signal to the user device to cause the user device to display on a user interface of the user device, a notification which indicates that the user has passed by and did not pick up the at least one item on the list of one or more items of the plurality of items when the user device was proximate to the at least one item on the list of one or more items of the plurality of items, wherein the notification displayed on the user device includes a picture of the at least one item on the list of one or more items of the plurality of items that the user did not pick up and indicates the distance between the user device and the at least one item on the list of one or more items of the plurality of items.

16. The system of claim 15, wherein the processor is configured to trigger the user device to provide a second notification to the user in response to the user device being proximate to the at least one item.

17. The system of claim 15, wherein, in receiving the user location information indicative of the user device associated with the user being proximate to or in the physical store, the processor is configured to receive the user location information entered by the user via a website associated with a merchant or receive real-time or periodic updates of the location of the user device.

18. The system of claim 15, wherein the threshold distance is adjusted by one or more users or retailers of the physical store.

19. The system of claim 18, wherein the threshold distance is predefined by the one or more users or retailers.

20. The system of claim 15, wherein the notification displayed on the user interface of the user device further comprises a textual description of the at least one item on the list of one or more items of the plurality of items that the user did not pick up.

* * * * *